United States Patent
Knauss et al.

[11] Patent Number: 6,127,592
[45] Date of Patent: Oct. 3, 2000

[54] HYDROUS PYROLYSIS/OXIDATION PROCESS FOR IN SITU DESTRUCTION OF CHLORINATED HYDROCARBON AND FUEL HYDROCARBON CONTAMINANTS IN WATER AND SOIL

[75] Inventors: Kevin G. Knauss; Sally C. Copenhaver; Roger D. Aines, all of Livermore, Calif.

[73] Assignee: The Regents of the University of California, Oakland, Calif.

[21] Appl. No.: 09/038,301

[22] Filed: Mar. 11, 1998

Related U.S. Application Data

[63] Continuation of application No. PCT/US96/14584, Sep. 12, 1996.

[51] Int. Cl.[7] .................................................. A62D 3/00
[52] U.S. Cl. ........................... 588/205; 588/206; 588/207; 588/208; 588/215; 588/238; 588/239; 588/243; 588/248
[58] Field of Search ..................... 405/128, 129, 405/263, 269; 588/205, 206, 207, 208, 215, 238, 239, 243, 248; 34/32, 73; 210/908, 909, 910, 758, 759, 760, 763

[56] References Cited

U.S. PATENT DOCUMENTS

| | | | |
|---|---|---|---|
| 5,094,012 | 3/1992 | Rosenstock et al. | 34/32 |
| 5,209,604 | 5/1993 | Chou | 405/128 |
| 5,276,249 | 1/1994 | Greene et al. | 588/206 |
| 5,813,799 | 9/1998 | Calcote et al. | 405/128 |

*Primary Examiner*—Steven P. Griffin
*Assistant Examiner*—Eileen E. Nave
*Attorney, Agent, or Firm*—John P. Wooldridge; Alan H. Thompson

[57] ABSTRACT

In situ hydrous pyrolysis/oxidation process is useful for in situ degradation of hydrocarbon water and soil contaminants. Fuel hydrocarbons, chlorinated hydrocarbons, polycyclic aromatic hydrocarbons, petroleum distillates and other organic contaminants present in the soil and water are degraded by the process involving hydrous pyrolysis/oxidation into non-toxic products of the degradation. The process uses heat which is distributed through soils and water, optionally combined with oxygen and/or hydrocarbon degradation catalysts, and is particularly useful for remediation of solvent, fuel or other industrially contaminated sites.

16 Claims, 8 Drawing Sheets

HYDROUS PYROLYSIS/OXIDATION PROCESS FOR IN SITU DESTRUCTION OF CHLORINATED HYDROCARBON AND FUEL HYDROCARBON CONTAMINANTS IN WATER AND SOIL

The United States Government has rights in this invention pursuant to Contract No. W-7405-ENG48 between the US Department of Energy and the University of California, for the operation of Lawrence Livermore National Laboratory.

This is a continuation of International Application PCT/US96/14584 with an international filing date of Sep. 12, 1996.

BACKGROUND OF THE INVENTION

Field of Invention

This invention relates to an in situ hydrous pyrolysis/oxidation process useful for in situ degradation of hydrocarbon contaminants in water and soil. In particular, the process uses heat distributed through soils and water, optionally combined with oxygen or air or catalysts, and is particularly useful for remediation of fuel or industrial contaminated sites.

BACKGROUND AND RELATED DISCLOSURES

Underground fuel storage-tank leakages and industrial spills have posed a serious environmental problem. Fuel leaks contribute significantly to the contamination of groundwater by gasoline, aviation fuel, and other refined petroleum derivatives. Industry, such as electronic, chemical and chemical cleaning plants, are responsible for contamination of ground water with halogenated, typically chlorinated solvents. Many fuel hydrocarbons and chlorinated hydrocarbons among the contaminants from fuel or industrial leaks are of particular concern because they are confirmed or suspected carcinogens, even at very low concentrations.

Many systems and methods have been developed to handle the contaminated sites. Examples include systems for containment of the contaminants, conventional pump-and-treat technology, methods for in situ dynamic underground stripping followed by ex situ treatments of contaminants, and methods for in situ treatments using various biological agents. None of these systems or methods, however, is capable of removing all contamination and cannot actually complete the remediation. The methods are unable to destroy or degrade the substantial residual amounts of hydrocarbon contaminants attached to the rocks, gravel, sand, clay or soil after the major decontamination efforts. A serious problem results because as the hydrocarbons are localized or concentrated in the immiscible bulk-organic-phase in the subsurface, pockets of organic-phase compounds continue to serve as slow release sources for sustained groundwater contamination. In addition, most current systems involve bringing the contaminant to the surface for a complicated and very expensive surface treatment. The cost associated with the surface treatment system of a typical pump-and-treat with vacuum extraction system is 59% of the total cost, and 46% of the cost of a thermal removal method such as Dynamic Underground Stripping.

Current methods offer only incomplete remediation essentially because much of the subsurface contamination is deeply embedded into soils through diffusion and sorption, and its release to the aqueous phase may also be limited by solubility. These sorts of limitations are known as mass-transfer limitations. Many of the cleanup methods mentioned above would work if not for these mass-transfer limitations. Using thermal methods overcomes these mass-transfer limitations by accelerating the rates of diffusion and sorption/desorption and by increasing the solubilities of the contaminant compounds. Although other oxidative methods have been proposed utilizing permanganate salts, Fenton's reagent, ozone, or other oxidants, they too suffer from the mass-transfer limitations. In addition, they present problems stemming from the inability to mix the reagent with the contaminant in the subsurface.

Attempts to design permanent containment systems for underground contaminants are not practical as such systems need to be properly and continuously maintained and monitored for indefinite periods of time. These systems may hold the contaminants within the system, but they do not remove or degrade them. Consequently, when using this approach, the problem is never solved, but merely postponed. Any major natural disaster, such as an earthquake, may destroy these containment systems and the instant release of large amounts of contained contaminant may be potentially extremely hazardous to the environment. Clearly, it would be advantageous to have a method available for the removal or degradation of these water and soil fuel hydrocarbon and chlorinated hydrocarbon contaminants which overcomes problems currently encountered with containment systems and in situ and ex situ treatments. Such a method would rapidly destroy all contaminants in the ground.

Several in situ methods for cleaning-up volatile organic compounds (VOC) involve the application of either heat alone or heat plus water and/or steam to mobilize volatile contaminants. This approach is essentially based on the physical properties of the VOCs. As the name implies, under appropriate conditions these contaminants volatilize. A good example of major efforts for fuel spill decontamination is a recently developed method for in situ dynamic underground stripping (DUS). The method, which is useful for removal of large amounts of volatile contaminants, is described in the Interim Progress Report, DOE publication UCRL-1D-109906 (1991), and in UCRL-1D-118187. (1994). During dynamic underground stripping, a targeted site is heated to vaporize the volatile contaminants. Once vaporized, the contaminants are removed from the spill site by vacuum extraction and treated ex situ. Dynamic underground stripping seems to be the best technique currently available to treat the large fuel spills. The cost of surface treatment is large, however, and prohibits application of DUS in many cases. The dynamic underground stripping method alone is highly superior to conventional vacuum recovery. In combination with the current process, almost complete decontamination can be achieved in a very short time.

One of the major problems facing the remediation of volatile contaminants and solvents is the remaining low concentration of volatiles which, while volumetrically insignificant, can render water undrinkable. The difficulty in removing these residual contaminants, owing to the limitations posed by mass-transfer at low temperature, makes it impossible to remove volatiles from most aquifers down to maximum contaminant levels, the drinking water allowable standards. The cost of the process, and the time to accomplish it, are prohibitive and prevent remediation of low-level contamination using the mass-transfer limited methods.

In situ bioremediation is another recently proposed method for removing aromatic hydrocarbon contaminants from the subsurface. Most laboratory studies described, for example, in *Environ. Toxicol. Chem.*, 8:75–86 (1989); *Appl.*

Environ. Microbiol. 53:2129–2123 (1987); 58:786–793 (1992); 60:313–322 (1994); and in Environ. Sci. Technol., 25:68–76 (1991), are directed at candidate microorganisms that may have potential uses in in situ aromatic hydrocarbon bioremediation. In order to simulate the normal groundwater environment, these studies have been conducted at low to moderate temperature conditions (12° C.–35° C.). In situ bioremediation can prove practical and efficient for degradation of residual contaminants remaining in the subsurface following the major decontamination efforts such as DUS, where the temperature is much higher (45° C. to 75° C.), when sufficient oxygen remains in the formation for the microbial metabolic destruction of the remaining fuel. In this instance, microbial removal of the residual amounts remaining after a thermal treatment has been demonstrated to be very efficient. However, delivery of oxygen to sediments that are water saturated is very difficult, and biodegradation processes have only been demonstrated for fuel hydrocarbons. Chlorinated hydrocarbons do not degrade under these conditions. Any method that would achieve or enhance the removal, destruction or degradation of the residual contaminants after the DUS method or complement the DUS method by degrading these compounds would be beneficial.

Another trend in contaminant removal utilizes biological agents such as existing biota, bacteria, etc. For example, U.S. Pat. No. 5,279,740 describes a process for improved removal of contaminants from ground waters. The process utilizes simultaneous introduction of steam and specific nutrients effectively enhancing the growth of naturally occurring or added hydrocarbon degrading biota. The patent utilizes separate wells for adding the steam and nutrients and separate extraction wells for removal of extracted liquids and gas vapors containing the contaminants. As an ex situ method, it suffers from the problems enumerated above.

A primary objective of this invention is to provide an in situ method for degradation of hydrocarbons, chlorinated hydrocarbons or other volatile contaminants using hydrous pyrolysis/oxidation following dynamic underground stripping or as a stand-alone method. In the case of utilization as a follow-n method subsequent to dynamic underground stripping, the new method takes advantage of the already existing injection-withdrawal wells and the persistently elevated underground temperatures for hydrous pyrolysis/oxidation affecting or enhancing the removal of degradation residual contaminants.

SUMMARY

This invention is a process for in situ hydrous pyrolysis/oxidation of fuel hydrocarbons, polycyclic aromatic hydrocarbons, chlorinated hydrocarbons, and other volatile contaminants. This process is useful for in situ degradation of hydrocarbon contaminants in water and soil. In particular, the process involves thermal degradation of chlorinated or fuel hydrocarbons, petroleum distillates, polycyclic aromatic hydrocarbons, and other contaminants present in the soil and water, into non-toxic products of the degradation, such as carbon dioxide, water, chloride ion, carboxylic or hydrochloric acids, and short chain alkanes. The process uses heat distributed through soils and water optionally combined with oxygen or air or catalysts, and is particularly useful for remediation of fuel or industrial contaminated sites. This invention is a replacement for excavation and "pump and treat" technologies of environmental remediation.

In this process, hydrous pyrolysis/oxidation is induced at a site of contamination by introducing under pressure to the site of contamination either steam, oxygen (or air), a catalyst of the hydrocarbon degradation, or any combination thereof. The build-in pressure may be relieved, and the hydrous pyrolysis/oxidation proceeds, resulting in degradation of the contaminants. The rate and degree of the hydrocarbon degradation is monitored to insure complete degradation and elimination of all contaminants.

Alternatively, the pyrolysis/oxidation of contaminants may be achieved by introduction of steam to the underground water (without addition of oxygen or a catalyst) and an oxidant of the contaminant, where the oxidant is oxygen or air and/or a mineral present in the ground. The oxidant may include the dissolved oxygen already present in the water, or mineral oxidants such as $MnO_2$ or $Fe_2O_3$, which are already present naturally in soils and rocks.

The process may use already raised temperatures in the underground remaining after in situ dynamic underground stripping method, and introduce only oxygen or a hydrocarbon degradation catalyst. The heating of the ground may be accomplished by electrical resistance (joule) heating, RF or microwave heating, or other electrical heating means.

This invention, hydrous pyrolysis/oxidation, has been demonstrated successfully to degrade compounds such as TCE, PCE, naphthalene, pentachlorophenol (PCP), creosote compounds (e.g., as contained in pole tar), ethylbenzene, methyl-tertbutyl ether (MTBE), and commercial machining/cutting fluids (e.g., RapidTap % and Alumicut %). Given sufficient dissolved oxygen (that is, greater or equal to the stoichiometric amount required under given concentration conditions), all these compounds are nearly completely "mineralized" to $CO_2$ rapidly (days to weeks) at temperatures of 100° C.–125° C. It is unnecessary to add additional oxygen in cases where a stoichiometrically sufficient amount of oxygen is already present in solution with the contaminant. At lower temperatures (e.g., 90° C.), oxidation proceeds at a slower rate and other, less completely oxidized although equally benign compounds are included in the degradation products (e.g., carboxylic acids, alcohols).

Figure 1:
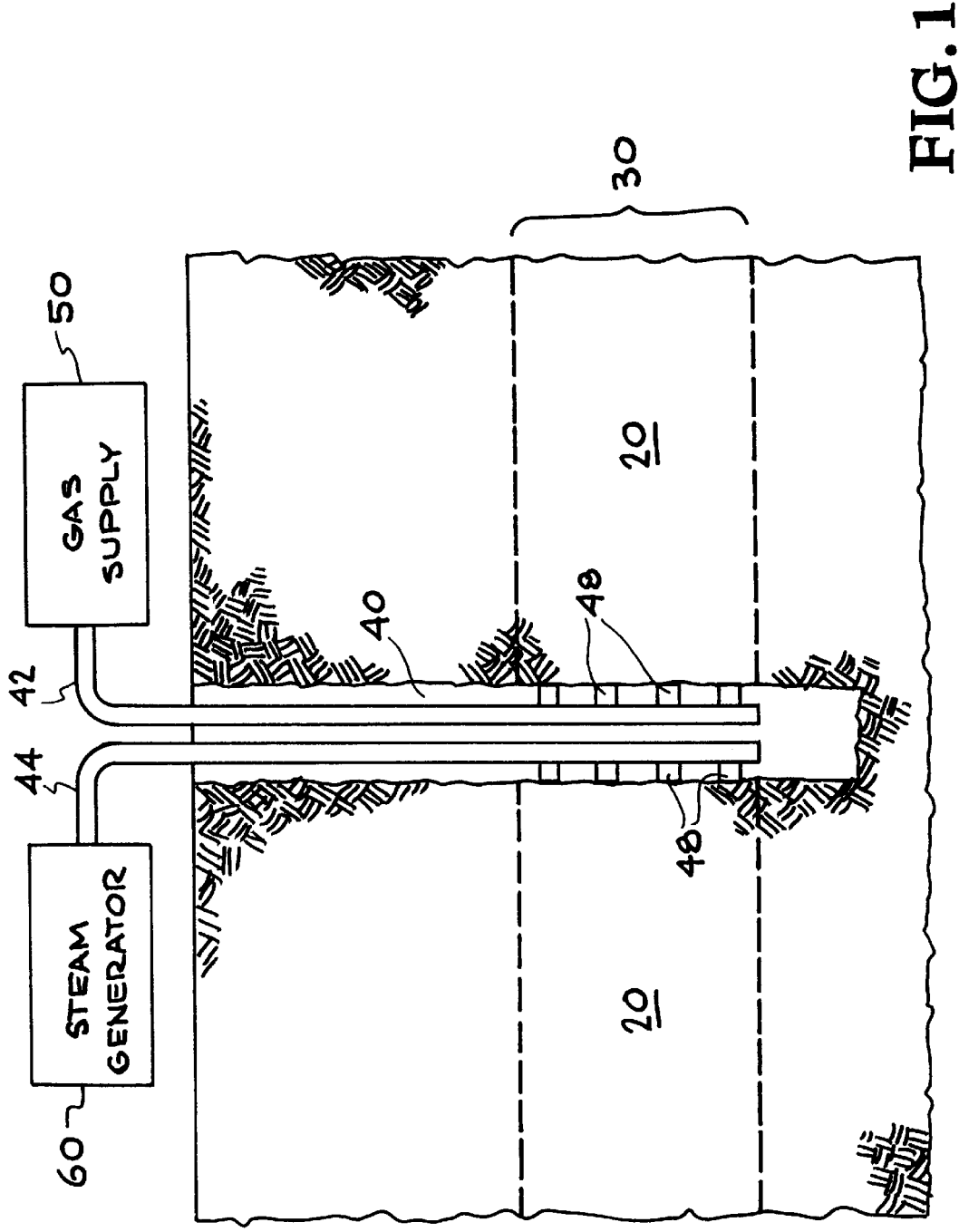
FIG. 1 is a schematic of field application of in situ thermal pyrolysis.

Definitions:

As used herein:

"Hydrocarbons" means hydrocarbons or halogenated, particularly chlorinated, organic solvents such as trichloroethane (TCA), trichloroethylene (TCE), perchloroethylene (PCE), dichloroethane (DCA) or dichloroethylene (DCE), etc.

"Fuel hydrocarbons" means those hydrocarbons commonly found in gasoline, diesel fuel, aviation fuel, etc., such as: monoaromatic substituted or unsubstituted benzenes, toluenes, ethylbenzene and xylenes (BTEX), and any and all their derivatives alone or in mixture with each other.

"Contaminants" means all compounds falling within the term hydrocarbons and fuel hydrocarbons.

"DUS" means Dynamic Underground Stripping method as described in the Interim Progress Report, UCRL-1D-109906 (1991) and in UCRL-1D-118187 (1994) DOE publications.

DETAILED DESCRIPTION OF THE INVENTION

The current invention is an in situ process for hydrous pyrolysis and/or oxidation (i.e., the degradation) of fuel hydrocarbon, chlorinated hydrocarbons or other contaminants of the soil and water following fuel or industrial spills or leaks. These materials comprise the dominant constituents of solvents, machining fluids, gasoline, etc. Hydrocarbons are degraded in situ to compounds that are non-toxic or less hazardous or have no established drinking water limits. Relatively rapid degradation is achieved by the application of heat from about 70° C.–200° C., although slower degradation will occur even at lower temperatures, down to perhaps as low as 40° C., after active heating is stopped. The process is aided by the addition of oxygen, and/or air, and/or mineral oxidants, and/or hydrocarbon degradation catalysts, although it may also occur without added oxidants by making use of the dissolved oxygen and/or mineral oxidants naturally present in soils and rock.

The invention is based on finding that organics are increasingly solvated by and reactive with water as temperature is increased. This occurs largely as a consequence of the precipitous drop in the dielectric constant of water as temperature increases. With increasing temperature, water becomes a progressively better solvent for organics. Under appropriate conditions when the temperature of the underground is increased, water reacts with hazardous organic contaminants to produce a relatively benign mixture of oxygenated compounds, such as carbon dioxide, chloride, alcohols, aldehydes and/or carboxylic or other acids. The rate of conversion of hazardous material and the yield of benign products resulting from the hydrothermal oxidation of hazardous organics materials is advantageously enhanced using a variety of oxidants and/or catalysts.

Briefly, the process comprises in situ acceleration of chemical hydrocarbon degradation via hydrous pyrolysis/oxidation reactions performed at increased underground temperatures. The process is enhanced by using degradation catalysts or oxygen or air. Both oxygen and catalysts may be added or the process may utilize the endogenously present oxygen or oxidation agents (i.e., oxide minerals) as catalysts.

Additionally, the process advantageously utilizes the conditions induced during the primary cleaning efforts of dynamic underground stripping (DUS) as well as the structures, such as wells, pumps, boilers, heaters, etc. Following DUS, due to the use of large amounts of added heat, the entire underground environment remains at elevated temperatures of 45°–80° C. for an extended period of time (at least 60 days) after the heat treatment following DUS.

I. In situ Thermal Degradation of Hydrocarbon Contaminants Using Hydrous Pyrolysis/Oxidation The process of the invention for in situ degradation of fuel hydrocarbons, chlorinated hydrocarbons or other contaminants, in its broadest form, involves (1) increasing or utilizes increased temperature in situ at a site of contamination and (2) inducing or enhancing in situ hydrolysis or hydrous pyrolysis combined with oxidation. In this manner, the contaminants are degraded fast or slowly, depending on the process conditions.

Generally, the degradation of contaminants is achieved by inducing or utilizing existing high temperatures above 70° C., preferably temperatures between 100° C. and 125° C., or higher. High underground temperatures are induced, preferably by introducing steam into the contaminated zone underground. The ground may also be heated electrically (ohmically). Additionally, at the same time, catalysts and/or oxygen and/or air can be introduced into the contaminated underground site. In the subsurface, the steam and oxygen and/or air and/or catalysts mix together and the hydrous pyrolysis/oxidation process begins.

There are several modes of achieving the chemical hydrocarbon degradation in situ. In the most preferred mode of the invention, the hydrocarbon degradation is achieved by hydrous pyrolysis combined with oxidation process where the steam and oxygen or air are both introduced into the contaminated underground, the underground is steam-heated to the required temperature optimal for the degradation of particular hydrocarbon contaminant, and the pressure build-up due to steam injection in the underground is optionally released. The steam, oxygen, and contaminated water mix together and the chemical degradation by hydrous pyrolysis and oxidation of the contaminant hydrocarbons proceeds to yield non-toxic or less harmful compounds such as carbon dioxide, chloride ion, carboxylic acids, alcohols, aldehydes, etc. The degree of contamination and a rate of decontamination are monitored using methods known in the art.

In another preferred mode, the steam and the hydrous pyrolysis/oxidation catalysts, such as manganese dioxide, or ferric oxide are introduced into the contaminated zone underground. The choice of catalysts and temperature for optimal rate of degradation depends on the particular hydrocarbon contaminant. Decontamination is monitored as described above.

In still another mode, the steam is introduced alone without either the oxygen or air or catalyst. This mode is useful for a site where there is naturally present in the ground an oxidizing mineral, such as, for example, manganese dioxide or ferric oxide, or at a site where the dissolved oxygen naturally present in the water is sufficient to oxidize the contaminant present. In this instance, the temperature is increased, by steam introduction and/or by ohmic heating, to a temperature optimal for degradation of the contaminant hydrocarbon in the presence of the naturally occurring oxidizing agent. Decontamination is monitored as described above.

The last mode of practicing the invention is by introducing oxygen and/or an appropriate catalyst into the contaminated zone following the dynamic underground stripping or other thermal remediation processes where the underground is already sufficiently warmed by the dynamic underground stripping. Typically, the temperatures between 45° C. and 80° C. remain in the underground for about two to three months or longer following dynamic underground stripping.

The remaining high temperatures are utilized for in situ hydrous pyrolysis/oxidation of the invention. In one alternative of this last process, the temperatures are further raised to higher temperatures by introducing steam with oxygen and/or air and/or catalysts. In another alternative, no oxygen or air or catalysts are added, but the temperature is further raised by steam additions. The last mode of the invention complements the primary dynamic underground remediation stripping. Decontamination is monitored as described above.

This invention has been demonstrated to be applicable to a wide variety of hydrocarbon and chlorinated hydrocarbon contaminants. Based on the range of classes of organic compounds already demonstrated to be amenable to hydrous pyrolysis/oxidation, this process is broadly applicable to any and all organic compounds, including substituted aliphatics, branched aliphatics, substituted aromatics, polyaromatics, oxygenated forms of all the preceding classes.

II. Theoretical Basis for Hydrous Pyrolysis/Oxidation

Recently, group contribution estimation techniques to calculate the free energies of formation of the aqueous and gas phase aliphatic chlorinated hydrocarbons was described in *Biodegradation* 5:21–28 (1994). The estimates were developed for a temperature of 25° C. and a pressure of 1 bar. Using this technique, the thermodynamic properties of hydrolysis and oxidation reactions involving degradation of compounds like chlorinated hydrocarbons, such as: TCE, TCA, DCE, DCA, PCE or chloroform, according to the invention, can be estimated and their thermodynamic driving force calculated.

In the development of this invention, calculations were made for a number of compounds of interest at 25° C., and for many of them, there was a significant thermodynamic driving force for the reaction to proceed. For example, the free energy of reaction ($\Delta G$) were theoretically calculated for the following aqueous and gas phase reactions (at 25° C.) involving TCE:

$$2C_2Cl_3H(aq)+3O_2(aq)+2H_2O=4CO_2(aq)+6H^++6Cl^-$$

$\Delta G = -467.9$ kcal/mol $$2C_2Cl_3H(g)+3O_2(g)+2H_2O(g)=4CO_2(g)+6HCl(g)$$

$\Delta G = -414.1$ kcal/mol $$C_2Cl_3H(aq)+3MnO_2(s)+3H^+=2CO_2(aq)+3Mn^{+2}+2H_2O+3Cl^-$$

$\Delta G = -228.1$ kcal/mol $$C_2Cl_3H(aq)+3Fe_2O_3(s)+9H^+=2CO_2(aq)+6Fe^{+2}+5H_2O+3Cl^-$$

$\Delta G = -164.9$ kcal/mol

Under the conditions of temperature, pressure and activity/fugacity implied in the above calculations, all these reactions have a significantly negative free energy of reaction and thus are energetically favored.

Similar reactions were estimated and calculated for many other aliphatic chlorinated hydrocarbons, such as chloroform, cis-1,2-dichloroethylene (DCE), perchioroethane (PCE), carbon tetrachloride, 1,2-dichloroethane (DCA), trichloroethane (TCA), trichloroethylene (TCE), etc. Similar calculations were made for PAH compounds (e.g., naphthalene) and these, too, indicated a significant thermodynamic driving force for the oxidation reactions. The results of these theoretical calculations led to investigation and discovery of the process for hydrous pyrolysis/oxidation including optimal condition for TCE and other hydrocarbon contaminants degradation.

III. In situ Thermal Hydrous Pyrolysis Degradation Process in Field Conditions

The field application of in situ hydrous pyrolysis/oxidation process is illustrated in FIG. 1. FIG. 1 shows the aquifer 20 containing site 30 contaminated with hydrocarbons or chlorinated hydrocarbons. FIG. 1 illustrates a system for the hydrocarbon degradation where only one well 40 is used. In system variations, two or more wells may be utilized. Generally, the number of wells will depend on the size of the spill area. Through well 40, two pipes 42 and 44, preferably made of stainless steel, are introduced into the underground water reservoir 20, preferably to the site of contamination 30.

In FIG. 1, the well is placed approximately in the middle of the contaminated site 30. Oxygen is supplied through pipe 42 from the gas tanker 50 or from any other gas storage place. Typically, the oxygen pipe is straight or preferably it branches into ducts 48 so that oxygen is distributed to various depths of the contaminated site and there it is mixed with steam having predetermined temperature optimal for degradation of the particular contaminant. Air may be substituted for oxygen when the presence of nitrogen in the air will not be deleterious. In general air will suffice for all but the most highly contaminated sites, where the build-up of nitrogen gas bubbles in the subsurface may impede injection of steam through permeability reduction. Steam temperature is such that it suffices to warm the underground to temperatures typically above 75° C., preferably between 100° C. to about 125° C. The degree to which the underground is warmed depends on the contaminant as well as on the degree of contamination. Generally, the higher the degree of contamination, the higher the temperature. The higher temperatures lead to higher rates of degradation. Similarly, more refractory compounds such as TCE require higher temperatures to oxidize than less refractory compounds such as TCA and therefore higher temperature are used for their degradation.

Steam is introduced to the site of contamination through the pipe 44 under pressure from a pump, compressor or a boiler 60. The pipe 44 may be straight or branched as seen for oxygen pipe. When the steam is introduced into the underground 30, there is a pressure build-up. The higher pressure forces the steam/oxygen mixture into the gravel, sand and rock cracks, crevices and spaces, and thus promotes greater degradation of contaminants. Using the same pipe 44 in reverse, or a separate pipe, certain amount of water may be optionally pumped out to relieve the pressure, using the reverse pumping or vacuum. In such an instance, the removed water is submitted to ex situ decontamination. However, it is only a small portion of the contaminated water, if at all, which needs to be removed and therefore the ex situ clean-up is not extensive. Steam is introduced via tube 44, which typically has a higher diameter and is also preferably made of steel as both steam and oxygen are corrosive agents.

Oxygen and steam are introduced to the site of contamination separately. In the mixture, these agents are very corrosive. Steam is introduced preferably in successive steam pulses. These steam pulses expand the heated zone through the contaminated site. Ground water returns between steam pulses and flows through the hot, oxygenated region destroying contaminants and washing away or diluting the decontamination products (typical carbon dioxide gas and chloride ion).

In this respect, the heating methods according to the invention are extremely robust. Since the contaminant is destroyed in place and does not have to be transported back out of the formation and treated ex situ, the overall process is even more efficient and economical than dynamic underground stripping as implemented at the gasoline spill areas.

The system and the process of the invention can, however, be supplementary to a primary decontamination effort, such as dynamic underground stripping. As discussed above, dynamic underground stripping provides a method for fast removal of large amounts of contaminants using hot underground temperatures. Underground stripping, however, does not necessarily completely remove all residual contaminants. At this stage, the current invention takes over and degrades, via hydrous pyrolysis/oxidation, these residual contaminants. In this way, the dynamic underground stripping combined with in situ pyrolysis provide the best available decontamination process for hydrocarbon contamination.

The dynamic underground stripping method alone is highly superior to conventional vacuum recovery. In combination with the current process, almost complete decontamination can be achieved in a very short time. The superiority of Dynamic Underground Stripping over conventional methods is illustrated in FIG. 2.

Figure 2:
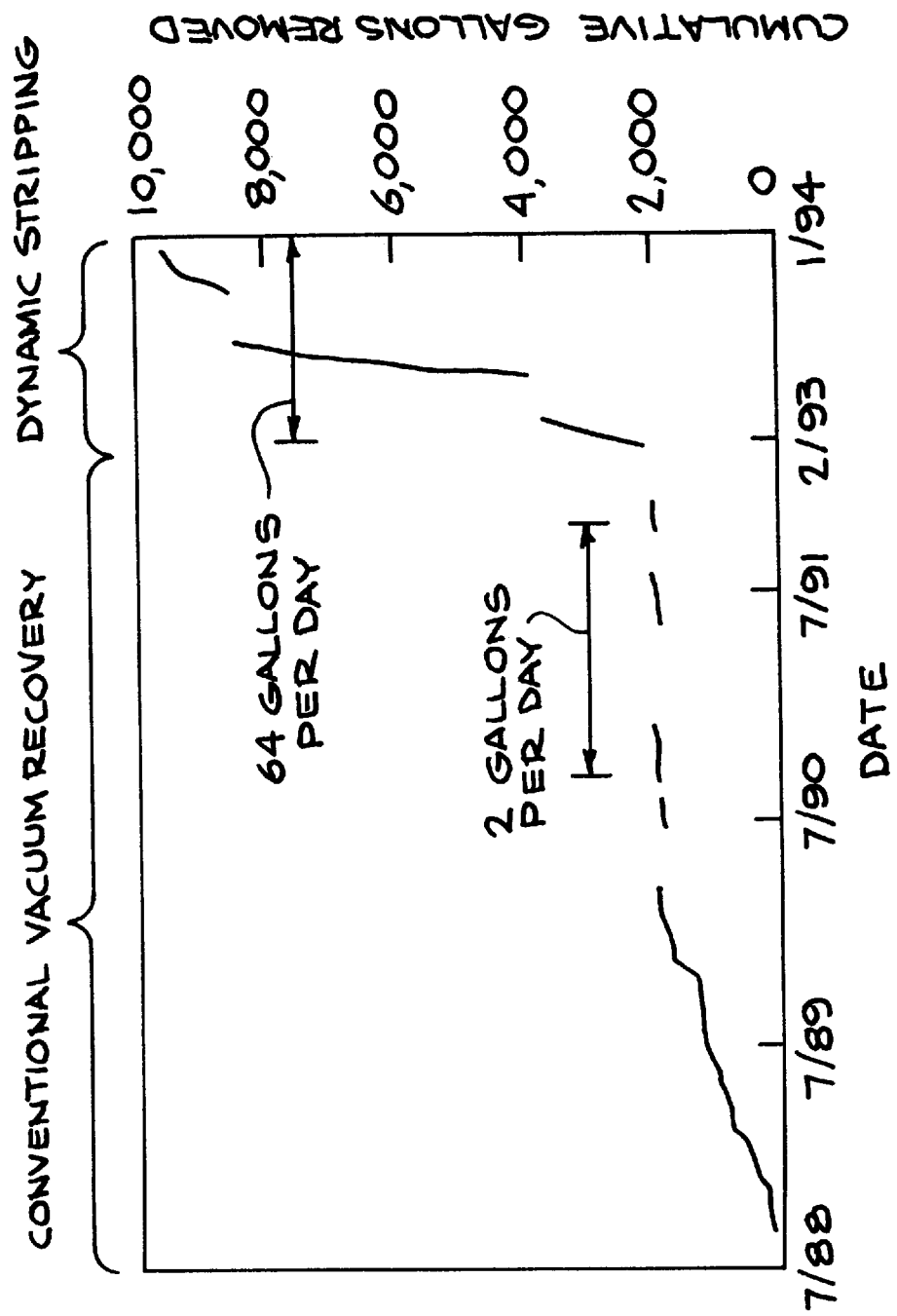
FIG. 2 is comparison of Dynamic Underground Stripping with conventional methods for removal of gasoline.

FIG. 2 illustrates results of gasoline removal during the dynamic underground stripping as compared to gasoline removal by conventional methods at the same site. This comparative study shows that large-scale heating and monitoring can be conducted safely and effectively and that large, stable steam zones can be constructed and maintained below the water table. As seen in FIG. 2, vapor recovery was extremely efficient from these zones, and where the conventional vacuum recovery pump and treat was able to remove 2.5 gallons of vapor per day, dynamic underground stripping method removed about 64 gallons of vapor per day.

One of the potential problems encountered during the development of this invention was the effect known as displacement. It is well known that injection of fluids for remediation is ineffective because the fluids displace the contaminant ahead of them. This leads to the possibility that injection of oxygen-rich steam according to the invention could merely displace the contaminant by pushing it away, and then the returning water would displace the steam on the return trip. While this can occur in the most permeable zones, in the current invention a number of factors mitigate this effect and help keep oxygen in the heated zone. These factors concern primarily the other driving forces that move things in the steam zone in directions other than parallel to the steam drive.

In the current process, as seen in FIG. 1, it has been determined that the steam zone grows perpendicularly as well as parallel to steam drive. Parallel steam growth can cause displacement. The evidence that the displacement does not happen during the hydrous pyrolysis/oxidation process of the invention is also seen in FIGS. 3 and 4.

Figure 3:
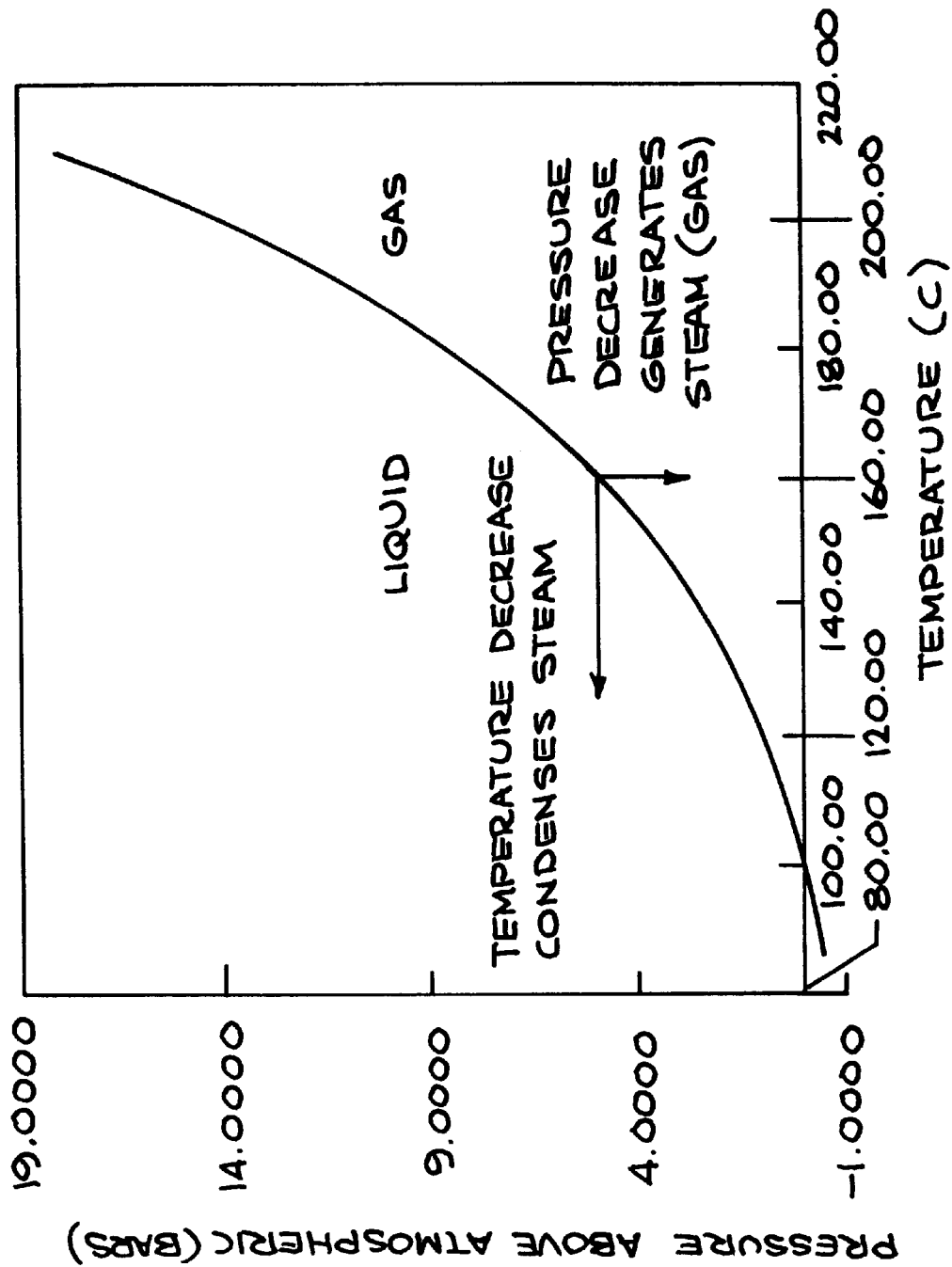
FIG. 3 shows the boiling curve of water in constrained temperature and pressure conditions where both liquid water and steam coexist.

FIG. 3 shows the boiling curve of water under constrained temperature and pressure where both liquid water and steam coexist. The effect of reducing the applied pressure on a heated zone is to generate vapor (steam). The effect of cooling a heated region is to create a vacuum as water condenses. FIG. 4 illustrates growth of heated zones in the gasoline spill site test of Dynamic Underground Stripping. FIG. 4 shows temperature logs from one well located near the center of the pattern. During injection, temperatures exceed 100° C. as the zone pressurizes. Adjacent silty layers heat by conduction and water is expelled from these zone by boiling. Oxygen-rich steam is able to occupy these areas, and condense to oxygenated water when steam pressure is released. FIG. 4 further shows lower steam zone collapse and reformation over five months of operation and the distribution of steam throughout various depth zones of wells and its dependence on the underground temperature.

Figure 4:
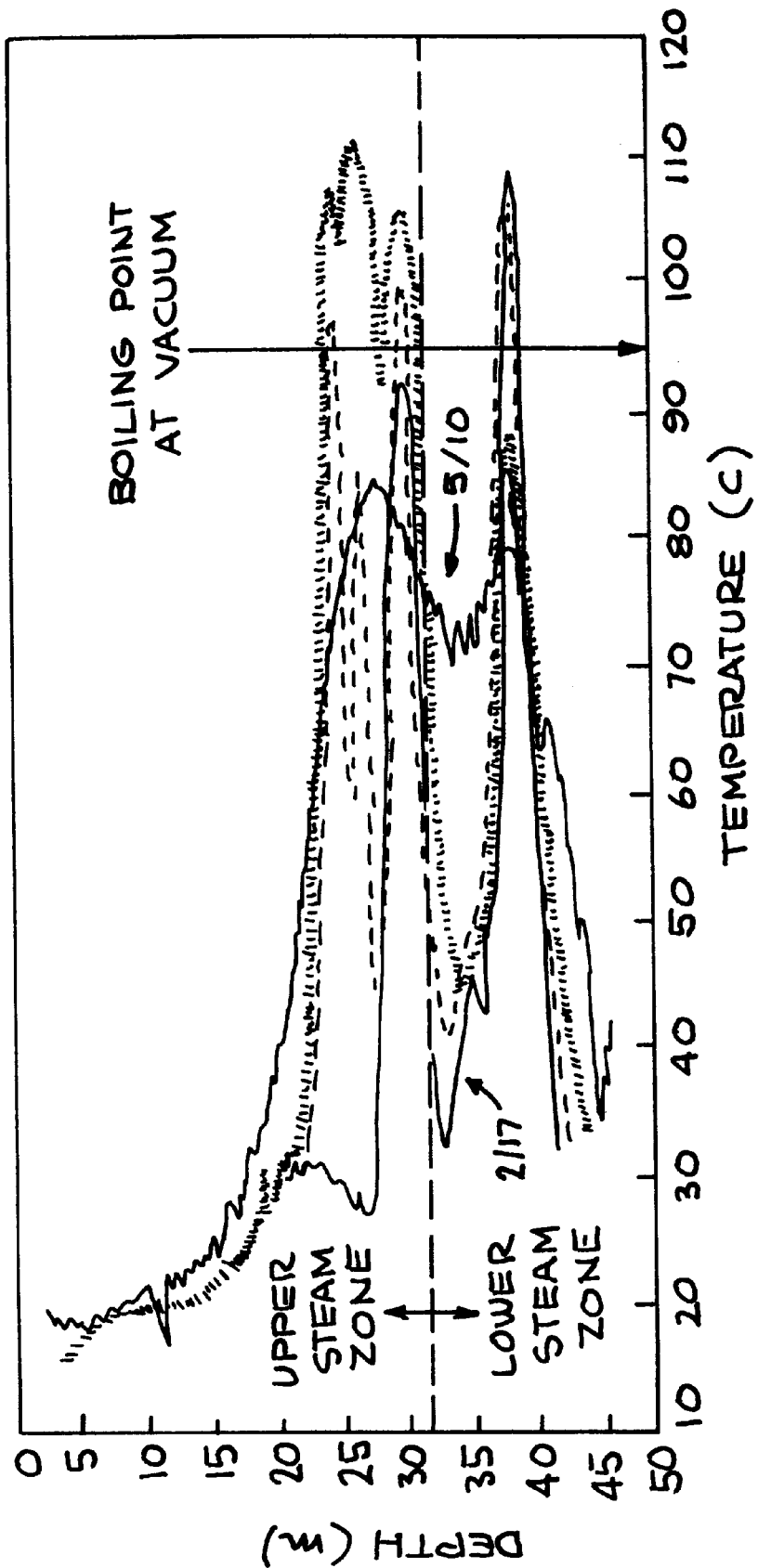
FIG. 4 illustrates growth of heated zones in the gasoline spill site test of Dynamic Underground Stripping.

As illustrated in FIGS. 3 and 4, the initial displacement of ground water in the gas pad tests occurred in a fairly narrow zone, about two meters thick. This is the zone in which classical piston displacement should be expected to occur, and it would be hard to get enough injected oxygen into this zone by itself. However, the zone continued to grow in the vertical perpendicular direction as can be seen in FIG. 1, by conduction and convection of heat. Only small-scale fluid displacements were observed. The thicker portions of the steam zone were difficult to re-flood on the return of the ground water. Oxygenated steam introduced according to the invention is cooler and would preferentially condense there. This steam thus has no rapid flow path and would not be removed because flow is perpendicular to the main aquifer.

When the detailed logs are examined from the formation and collapse of steam zones at the gas pad demonstration, the extent of the overheating can be clearly seen in FIG. 4. When the formation temperature exceeds the boiling point of water at the applied pressure (FIG. 4, vertical line), the extra heat stored in the formation must be dissipated in steam formation. In these peripheral zones, as the temperature cools and more steam is converted to liquid water, a mild vacuum ensues and pulls water into the zone to reflood it. This water will come from the aquifer, which has re-flooded with the original contaminated fluid.

Alternatively, if the applied pressure on the formation is atmospheric and the applied pressure on the steam zone represents the boiling point of water at the temperature achieved, then when steam injection is halted the formation behaves like the cylinder in a steam engine. As heat is lost to the formation from the steam zone, steam condenses and a vacuum occurs, drawing water in from the surrounding formation just as the condensation in a steam engine draws in the piston.

Fluid displacement of water in the permeable parts of the aquifer, as described above, allows removal of a certain percentage of the contaminant. Due to dispersion, however, most of the contaminant appears to be in the peripheral zones which are still somewhat permeable but which have more surface area.

The current process can be advantageously coupled to the other treatment methods as already described above. The process is particularly cost effective when it is used as a follow-up on the primary cleaning using dynamic underground stripping. Additionally, the process can be combined with a biofilter built-in downstream. In this application the hydrous pyrolysis/oxidation process provides an active drive mechanism forcing water through the biofilter as described in Example 1.

The process can be also advantageously combined with a pump and treat process. Warming the water will reduce sorption, increase diffusion, reduce viscosity, and in general increase the effectiveness of pump and treat operations. Pump and treat screens can be very effective at controlling the flow of contaminant downstream from a thermal remediation operation. If there are other contaminants that are not destroyed in situ, pump and treat (water or vacuum extraction) can be used to extract the contaminant in huff- and puff mode. The efficiency of such a combination would be very high. Extracted hot water could be airstripped before cooling, which is both an effective cleaning and cooling method.

The current process can also be modified for use in small spills or leaks, such as for treatment of cleaning stored waste water or for small industrial leaks. In this case, instead of introducing steam, in situ temperature can be advantageously raised by other thermal means such as electric heating. Slow electrical heating of the soil or water, over a period of several years, will allow destruction of fuel or chlorinated hydrocarbon in place, if enough oxygen is present. This application may be most advantageous in soils with very low permeability, or in cases where additional radioactive contamination such as tritium is present. It is generally advantageous in these cases to permit no movement of contaminated fluid, so as to not re-distribute the radioactive contaminants.

The extremely corrosive nature of mixtures of steam and oxygen or air is well known. This process takes advantage of the general resistance of soils to oxidative corrosion, since most soils have formed by long contact with air and oxygen. Thus soils and rocks may be expected to provide an appropriate containment vessel for the hydrous pyrolysis/oxidation reaction, which could not be accomplished on the surface in normal industrial materials such as steel which would rapidly corrode under these conditions.

IV. Experimental Laboratory Testing

The process for this invention was successfully developed and tested in laboratory experimental settings. Various hydrocarbon contaminants, various temperatures, pressures, presence or absence of oxygen and presence or absence of mineral oxidants were tested before the field decontamination treatment was designed.

For this purpose, laboratory static autoclave experiments were used to determine the optimum chemical conditions for remediating contaminants via hydrous pyrolysis/oxidation. The initial phase of this experimental work was used as a vehicle for designing an in situ thermal remediation technique applicable to fuel hydrocarbons, halogenated hydrocarbons, and other contaminants. The field treatment process in the laboratory was simulated to measure the impact of treatment on soil transport properties and fluid chemistry, and to identify the organic/aqueous fluid-solid reactions that occur.

The static autoclave experiments were run in Dickson-type, gold-bag rocking autoclaves. The autoclave reaction vessel uses a flexible gold bag sealed with a high purity titanium head and is contained within a large steel pressure vessel. The autoclave design allows periodic sampling of the reaction cell under in situ conditions throughout the course of an experiment without disturbing the temperature and pressure of the run. During the experiment the solution contacts only gold and carefully passivated titanium so that unwanted surface catalytic effects are eliminated. Various combinations of solid, liquid or gaseous catalysts or oxidants were introduced into the reactor in order to study their effects on reaction mechanisms and rates. The sampled fluids and gases were analyzed using a variety of analytical techniques including ICP-ES, IC, gas chromatography (using purge and trap), gas MS, GC/MS, and high pressure liquid chromatography.

All experiments were conducted in non-reactive flexible gold bag hydrothermal systems, so that complications due to experimental artifacts from catalysis by the equipment itself were avoided, and both temperature and pressure could be precisely controlled. Many samples can be taken and tested as the reaction proceeds without affecting the conditions of the reaction itself. This allows detection of the exact reaction mechanisms, which involve the production of H+ion, carbon dioxide, and free chloride anion.

Before the current invention was developed, there were almost no data available on the elevated temperature thermodynamic properties of the hydrocarbons or halogenated hydrocarbons. The static autoclaves were, therefore, also used in the determination of liquid phase solubility for hydrocarbons and halogenated hydrocarbons which were needed and useful for determination of the optimal conditions for hydrous pyrolysis/oxidation of various hydrocarbons.

In practice, before the hydrous pyrolysis/oxidation process is used for any contaminant, its theoretical basis is calculated as seen in section II, followed by laboratory testing as seen in section IV. Only after these conditions are determined according to sections II and IV, the field determination is instituted according to section III.

V. In situ Hydrous Pyrolysis/Oxidation of Trichloroethylene in a Laboratory Setting During actual experimental testing of hydrocarbon degradation, the first chlorinated hydrocarbon tested was trichloroethane (TCE). Other tested contaminants included: PCE, naphthalene, PCP, creosote compounds (e.g., as contained in pole tar), ethylbenzene, MTBE, and machining/cutting fluids (e.g., RapidTap % and Alumicut %).

A Dickson-type autoclave, as described above, equipped with a precision high pressure liquid chromatography pump to control pressure was used to measure the solubility of TCE in water as a function of temperature from 298 to 398 K at constant pressure. Obtained results were used to calculate the partial molal thermodynamic quantities for the dissolution reaction of TCE in water at 298 K: $\Delta G_{soln}$=11.1 ($\pm$71) KJ/mol, $\Delta H_{soln}$=3.075 ($\pm$525) KJ/mol and $\Delta S_{soln}$=-28.29 ($\pm$1.61) J/mol-K.

Using the same experimental set-up, the hydrous pyrolysis/oxidation of TCE dissolved in pure water containing various concentrations of dissolved oxygen or solid manganese dioxide at temperatures varying from 50° C. to 150° C. was studied. In the initial experiments, very high concentrations of TCE (up to $\geq$600 ppm) and dissolved oxygen (typically up to several hundred ppm) were used. These TCE concentrations were much higher than most typical contaminated sites. These high concentrations were selected in order to determine that the current approach would be feasible for the hydrous pyrolysis/oxidation process in the worst possible situations. In addition, by starting with high concentrations of TCE, the presence of possible deleterious products could be more easily observed.

Dissolved oxygen was found to rapidly and completely degrade TCE to benign products, predominantly to carbon dioxide and chloride anion at temperatures easily achieved in in situ conditions of thermal remediation techniques. At temperatures above 90° C., the TCE was completely degraded to minimal detection limits in from one to a few days to several weeks, depending on the temperature. The TCE concentration in the initial runs with high starting concentrations decreased as much as 10,000-fold., eventually reaching the drinking water MCL (5 ppb). The TCE degradation products were hydrogen ions, free chloride anions and $CO_2$ as expected for complete oxidation (mineralization) of the chlorinated hydrocarbon.

In another set of runs with high initial dissolved oxygen concentration, ethylbenzene and MTBE were subjected to hydrous pyrolysis/oxidation at 100° C. and 125° C. These compounds were also converted largely to $CO_2$. Other products included slightly less oxidized compounds, i.e., alcohols. No deleterious compounds were produced in the hydrous pyrolysis/oxidation of ethylbenzene or MTBE.

Figure 5:
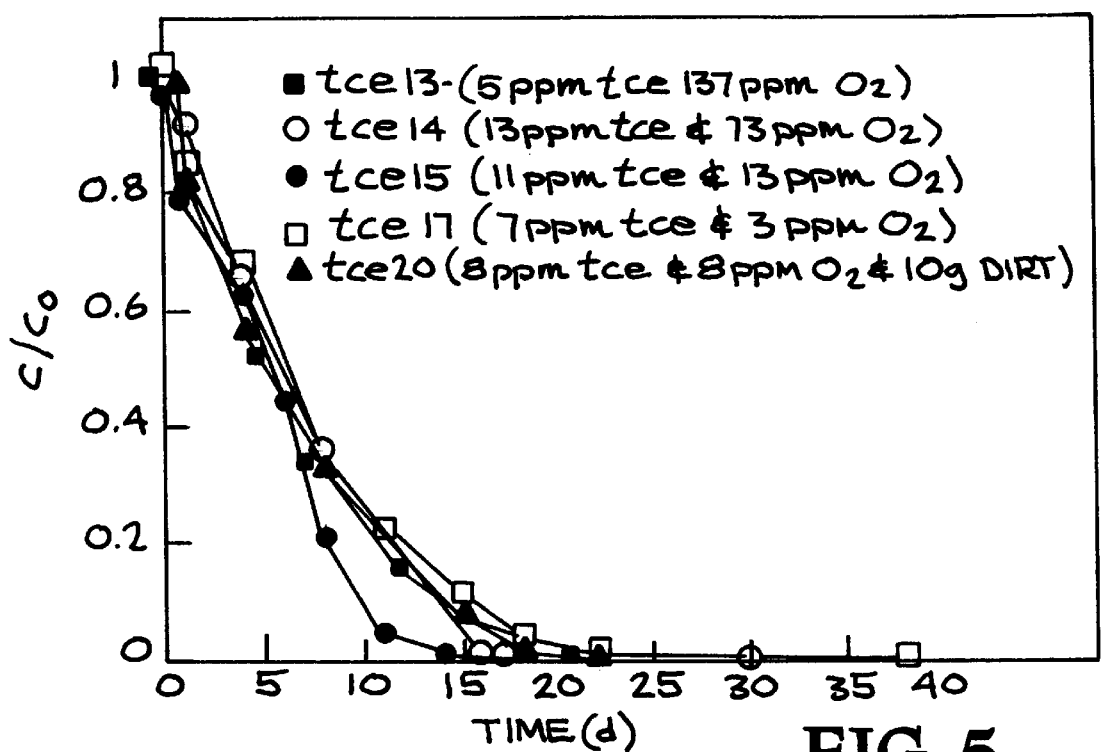
FIG. 5 shows the oxidation of dissolved TCE with dissolved oxygen and the oxidation of TCE in the presence of rock/soil from drillcore.

Subsequent studies were designed to measure the impact of oxygen concentration on the rate of TCE destruction. As seen in FIG. 5, a series of runs were conducted all with nominally the same starting TCE concentration (~9 ppm), and all conducted at the same temperature (~100° C.) but with varying dissolved oxygen concentrations ranging from 137 ppm to 3 ppm. In all runs, the dissolved oxygen starting concentration is equal to or greater than the stoichiometric amount required to completely mineralize the TCE. As can be seen, the rates of reaction are independent of dissolved oxygen at this temperature, as long as sufficient dissolved oxygen is present. These results clearly suggest that, depending on the initial TCE and dissolved oxygen concentration in the contaminated zone, it may be possible to conduct hydrous pyrolysis/oxidation without any added air or oxygen, or it may be sufficient to use air alone as the oxidant, or it may be required to use oxygen gas.

Also included in FIG. 5 are the results of a run comparable in initial TCE and dissolved oxygen concentration to the others in this series, but with aquifer rock/soil ("dirt") added. This was done to assess the impact of minerals on TCE destruction, oxygen consumption, solution composition, etc. Clearly, under the conditions of this run, the results were indistinguishable from the runs conducted in the absence of aquifer minerals.

The acid produced during hydrous pyrolysis/oxidation is rapidly consumed by the feldspar minerals present in aquifer rocks and soils and the ground water does not become appreciably acidic in the field. This is clearly seen in comparing the soil containing run to the other runs, which contained no soil minerals. The soil containing run maintained a relatively constant pH, because the $H^+$ produced during hydrous pyrolysis/oxidation of TCE was removed from solution by ion exchange processes on the surface minerals present. This same effect would be seen in the subsurface during a remediation effort.

A similar set of experiments was conducted to investigate the impact of varying dissolved oxygen concentration on the hydrous pyrolysis/oxidation of naphthalene and PCP. These runs were made at 100° C. and 125° C. It was again observed that hydrous pyrolysis/oxidation proceeded at a rapid rate, as long as at least a stoichiometrically sufficient amount of dissolved oxygen were present. The naphthalene runs showed that although this compound is more stable towards oxidation that the aliphatic or aromatic chlorinated hydrocarbons, it also oxidizes rapidly enough at 125° C. to be amenable to remediation using hydrous pyrolysis/oxidation. Pentachlorophenol was found to degrade very rapidly even at 100° C. In runs with relatively low dissolved oxygen (just barely above the stoichiometric amount) the intermediate tetrachlorophenol (TCP) was observed. Eventually, the ultimate products were $CO_2$ and $Cl^-$ anion.

Figure 6:
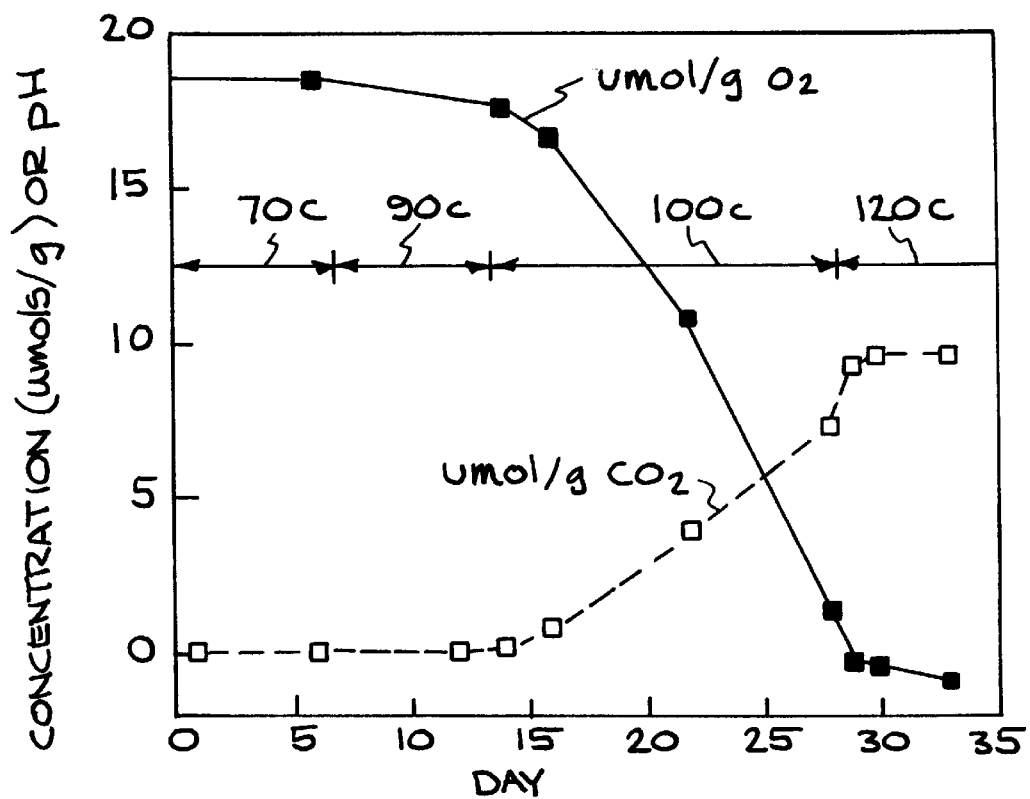
FIG. 6 shows the oxidation of complex pole-tar components such as polycyclic aromatic hydrocarbons.

In a test of the applicability of this method to the remediation of real, complex mixtures of hydrocarbons, a test was conducted using pole-treating residue from a site in Southern California. At this site, creosotes, petroleum products, and pentachlorophenol were used. A separate organic liquid composed mainly of creosotes and other petroleum-compounds can be recovered from beneath the water table at the site. This free organic liquid was used in testing. Two tests were conducted on this complex mixture (Table 1). Analytical results were obtained only for the polycyclic aromatic hydrocarbons, which are the chemicals of regulatory concern. Other petroleum compounds were not analyzed; in general they are similar to diesel fuel. The "Equilibrated Water" was stirred with an excess of the heavier-than-water organic liquid for three days. The "Partially Reacted Water" is the result of reacting the free-product/water mix at up to 120° C. until all oxygen was consumed, stopping the reaction. The "Completely Reacted" test used the decanted, equilibrated water (no free product) with an excess of oxygen. The results of this test are shown as a function of time and temperature in FIG. 6. The completely reacted water (14 days at 100OC followed by 6 days at 120° C.) shows no detectable trace of polycyclic aromatic hydrocarbon contaminants; at the detection limits of this measurement, that corresponds to at least 92% destruction. All compounds were destroyed, even notably difficult compounds to bio-degrade such as benzo(a) pyrene. The "partially reacted" experiment which consumed all the oxygen, stopping the process in mid-reaction, no deleterious intermediate products were detected. Only hydroxylated forms of the original compounds were seen as intermediates. These disappear when the water is completely reacted.

Figure 7:
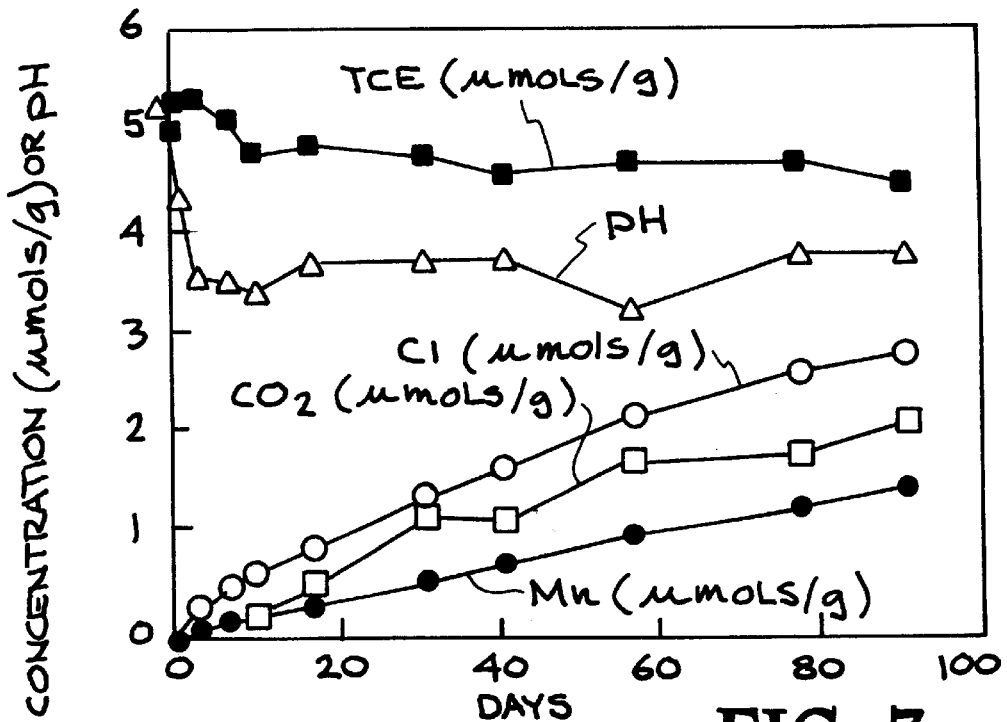
FIG. 7 shows oxidation of dissolved TCE by solid $MnO_2$ at 100° C.

Oxidation of TCE via coupled $MnO_2$ reduction was also investigated at 100° C. and 150° C., as shown in FIG. 7. These runs were designed using very high TCE concentrations, again with the intent of maximizing the ability to detect deleterious reaction products and to demonstrate useful degradation even under conditions of extreme contamination. The oxidation of TCE by mineral phases common in soils, such as manganese dioxide or ferric oxide, can occur in the absence of dissolved oxygen. In these laboratory experiments, a very well-crystallized mineral (d-$MnO_2$) with very low specific surface area was used. Experiments showed that the soil mineral $MnO_2$ can oxidize TCE, and produced benign products ($CO_2$, $Cl^-$ anion and $Mn^{+2}$ cation). However, the heterogeneous reaction is limited by the surface area of oxide mineral present and by the rates of the various surface chemical processes involved in the coupled oxidation-reduction reaction, therefor, the overall rate of TCE oxidation can be slower than that achieved in homogeneous aqueous phase reaction involving dissolved oxygen in solution.

The finding that $MnO_2$ can oxidize TCE is very important because it indicates that in a field application even those more distal areas, too far away to benefit directly from the injection of $O_2$ gas (if required) into a TCE hotspots, will achieve TCE degradation, because oxidants like $MnO_2$ are ubiquitous in soils. All that is needed for hydrous pyrolysis/oxidation to proceed under the field conditions is heat and time. Since the earth is an excellent insulator, heated areas stay warm for many years. Even at comparatively low rates, mineral oxidation can be an important finishing step in a remediation scheme because residual TCE, such as trapped in zones initially not heated, will eventually be oxidized even in the absence of oxygen and additional steam heating.

Geochemical/hydrological modeling of the behavior of chlorinated hydrocarbons at elevated temperatures is severely impacted by the lack of appropriate thermodynamic data. The thermodynamic data are, however, required for designing strategies for the thermal remediation of these compounds. The experimental and analytical approach that was used and the manner in which thermodynamic quantities are calculated from liquid-liquid solubility measurements, are described in *Geochim. Cosmochim. Acta.* 59:2443–2448 (1995). By making mutual solubility measurements values for the Henry's Law constant as a function of temperature and pressure can also be calculated.

Figure 8:
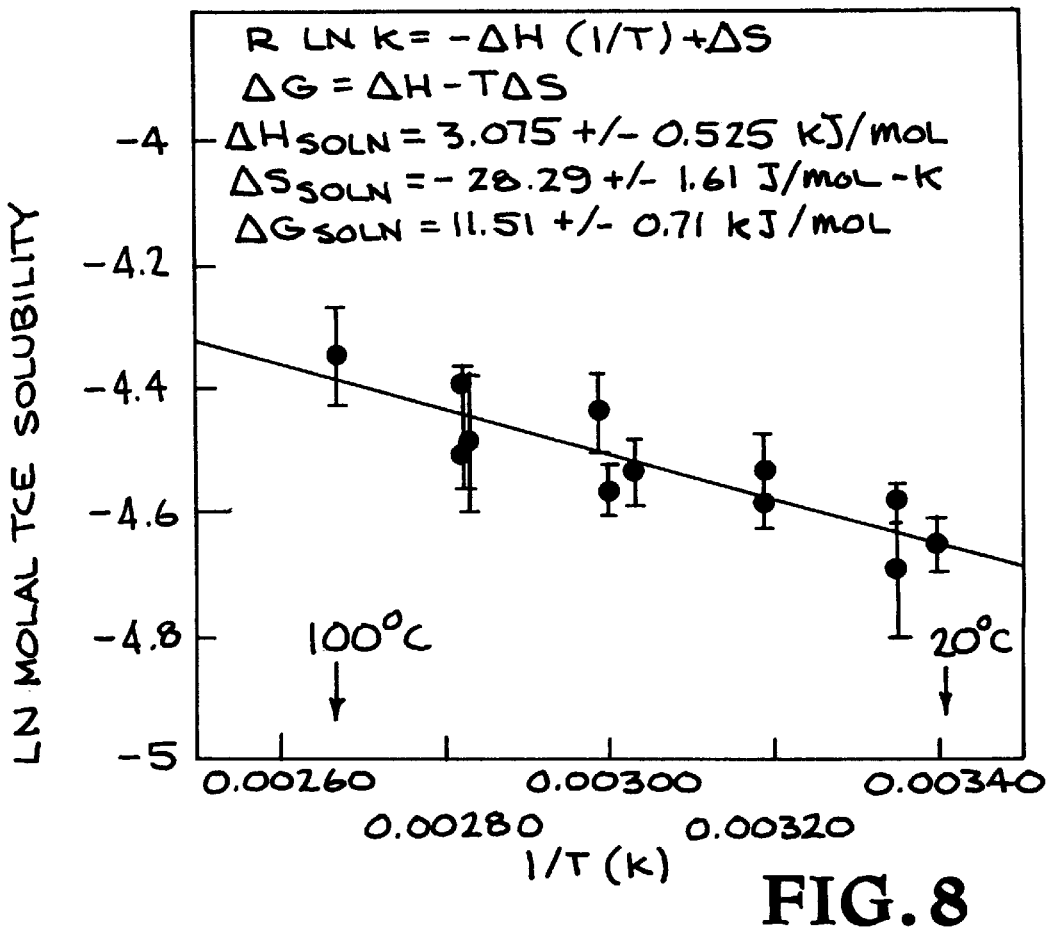
FIG. 8 is the van't Hoff plot of TCE solubility and calculated thermodynamic quantities.

For these calculations, measurements of the solubility of liquid TCE over the temperature interval 25° C.–100° C. and pressure interval 14.5–7250 psi were made. These measurements allowed determination of the thermodynamic properties of TCE necessary for modeling its behavior in ground water systems for field application. Liquid TCE solubility increased with increasing temperature. Based on a regression analyses of the data, TCE solubility at any temperature of interest up to 100° C. can now be calculated. The thermodynamic properties $\Delta G_{soln}$ (free energy of solution), $\Delta H_{soln}$ (enthalpy of solution) and $\Delta S_{soln}$ (entropy of solution), which are needed to construct hydrologic transport models of TCE behavior in ground water as a function of temperature were also calculated. These values (and their errors) are calculated by regression, and are shown in FIG. 8. FIG. 8 is the van't Hoff plot of TCE solubility and calculated thermodynamic quantities.

Although the relative rates of reaction for the studied compounds can be estimated by the temperature at which the reaction is observable, an estimate of the long-term rates of reaction is desirable for cases in which lower reaction temperatures (such as 70° C.) will be used. Such a determination has been preliminarily made for TCE using the Arrhenius equation, $E_a = -Rd(\ln rate)/d(1/T)$. Between the temperatures of 50° C. and 120° C. the reaction shows an apparent activation energy ($E_a$) of 81 kJ/mol, corresponding to an increase in the reaction rate of 2.2 times for each 10° C. rise in temperature. This falls within the range of 50 to 85 kJ/mol typically seen for aqueous reactions.

Figure 9:
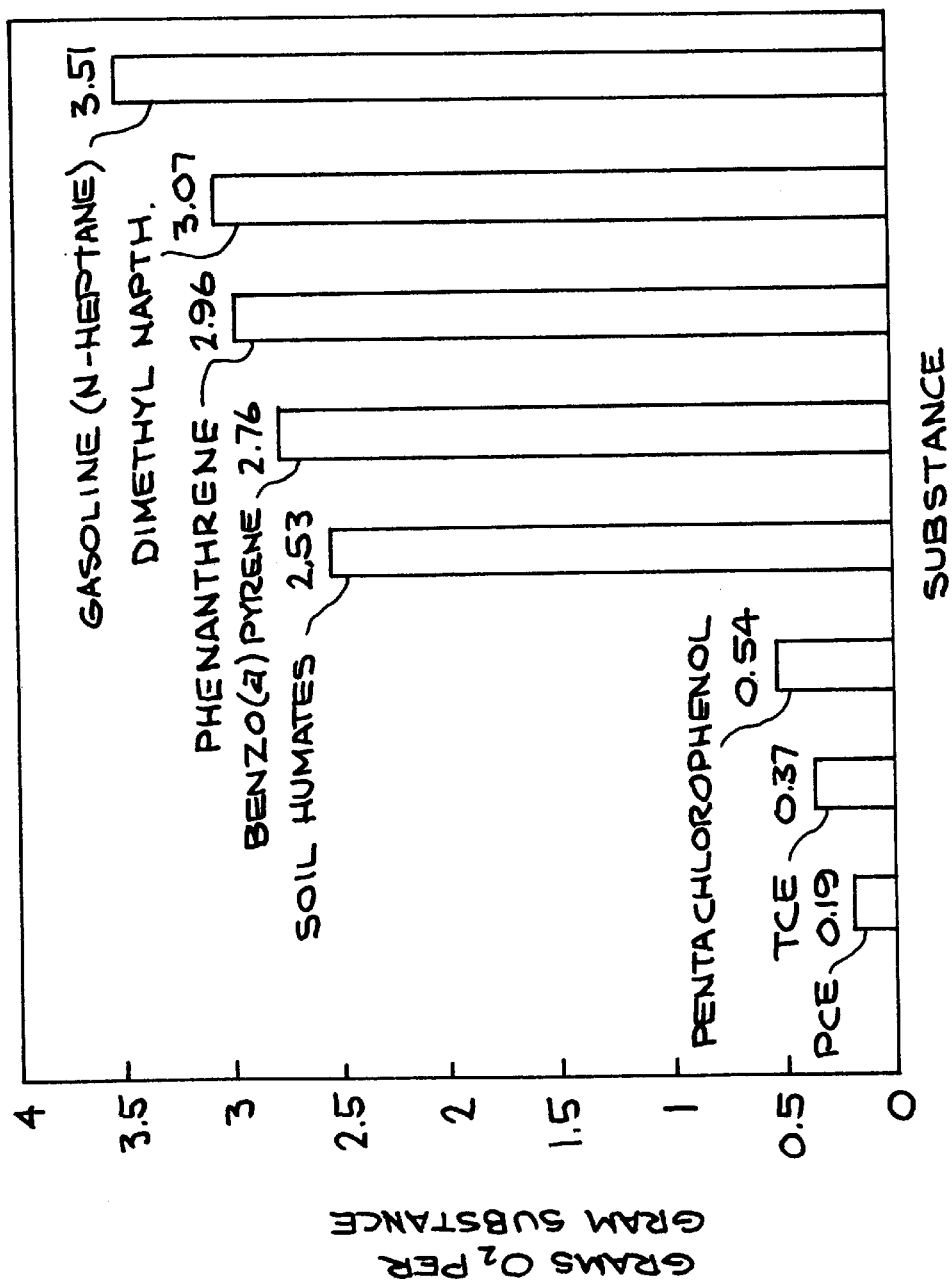
FIG. 9 shows the oxygen demand for the present process for several typical contaminant chemicals.

The amount of contaminant that can be destroyed by this process is determined by the oxygen demand for that compound, and the oxygen solubility in water at the reaction conditions. FIG. 9 shows the relative oxygen demand for several typical contaminants. Chlorinated compounds such as PCE require very little oxygen to be converted entirely to mineral components $H_2O$, $CO_2$, and $Cl^-$ ion. Only 0.19 grams of oxygen per gram of PCE are required. Alternatively for typical gasoline (represented by n-heptane) over 3.5 grams of oxygen are required per gram of contaminant. A typical, well-oxygenated ground water contains 4 parts per million of oxygen. Thus, in this typical ground water, without adding any oxygen, hydrous pyrolysis/oxidation could destroy over 20 ppm of PCE contaminant, but less than 1 ppm of gasoline. When more oxygen is required it must be added the steam or heating process, as described previously.

Figure 10:
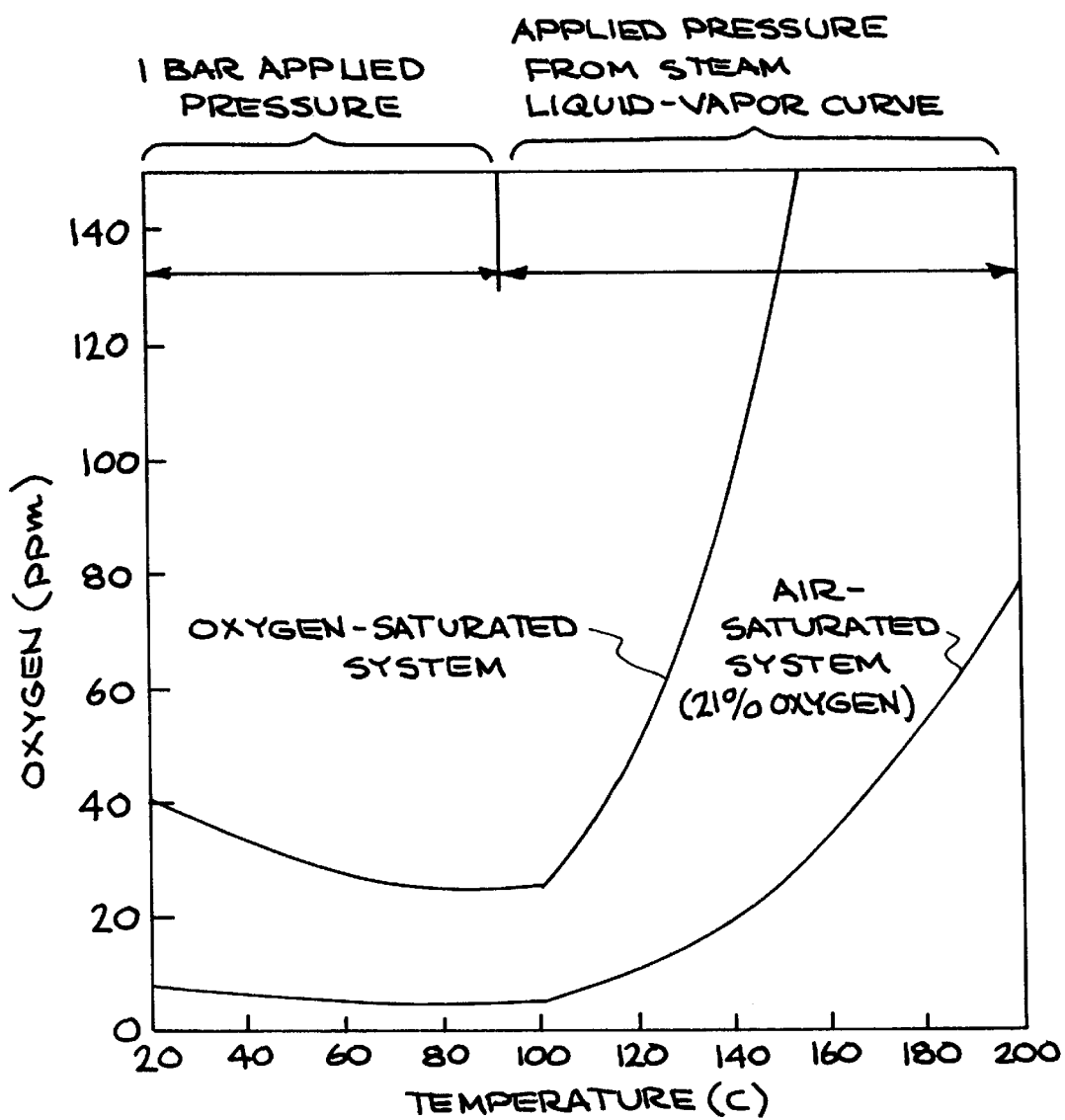
FIG. 10 shows the range of achievable oxygen concentrations in ground water when steam injection is used to maintain an applied overpressure.

FIG. 10 shows the amount of oxygen that can be achieved in water which is heated, and is thus in equilibrium with steam. Air-saturated water contains about ⅕ as much oxygen as that saturated with pure oxygen gas. As the temperature increases, the solubility of oxygen decreases slightly to a minimum at 100 C of 25 ppm. Above that point, much more oxygen can be held in the water, because of the applied pressure from steam. In cases where the natural oxygen content of the ground water is insufficient, FIG. 10 shows the limits of how much oxygen can be obtained through addition of air or oxygen gas with steam. In cases where even this amount is insufficient, such as large amounts of free organic liquids, multiple injections of oxygen-saturated steam may be made, sequentially destroying portions of the contaminant, similar to the experimental process described in Table 1.

The utility of this invention stems from the finding that in situ hydrous pyrolysis/oxidation can convert harmful and toxic hydrocarbon contaminants, such as chlorinated hydrocarbons and fuel hydrocarbons, into benign products. The method is particularly useful as a follow-up to and complements other primary remediation techniques.

One such technique is dynamic underground stripping. Following dynamic underground stripping remediation, there is an extended period of time during which the entire underground environment remains at temperatures significantly higher than ambient. During this time parts of the system cool down relatively quickly as a result of natural groundwater recharge, while other parts of the system cool much more slowly. These and other factors contribute to the fact that an unknown amount of each of the known hazardous and toxic contaminants, such as chlorinated hydrocarbons TCE, PCE, PCP or benzene, toluene, ethylbenzene and xylenes (BTEX), MTBE, or naphthalene that result from a fuel hydrocarbon spills, remain as residuals in the subsurface and potentially contaminate ground water. These residual toxic compounds are concentrated preferentially in regions poorly accessible to a steam flood, e.g. to regions of relatively low permeability, or they remain tightly adsorbed onto surfaces of various mineral phases, and moderate to low concentrations of the residual hydrocarbons remain behind as dissolved components in the groundwater phase. These residual contaminants are primary targets of the process of the invention.

The in situ hydrous pyrolysis/oxidation process of the invention provides several advantages over any other method previously employed. First, it is compatible with the temperatures produced during steam stripping or Joule heating and therefore offers a technology that is useful and can be applied to any site where steam or electrical heating is utilized or with other primary remediation techniques. Second, the invention does not require any special equipment other than the one used for DUS as long as the high temperatures is present and oxygen can be introduced. Third, the lifetime of the hydrous pyrolysis/oxidation process is extended over the period of time over which the soils and sediments remain at elevated temperatures. Fourth, optimal conditions for degradation of hydrocarbon contaminants can be easily induced or improved by introducing steam or using electrical heating to fine tune subsurface temperature regimes. Fifth, the overall rate of contaminant degradation may be set and controlled by addition of oxygen or air or degradation catalysts. Sixth, the invention is practical, inexpensive, versatile and useful for a large-scale field remediation or for small industrial leaks or spills. Finally, in terms of cost, more than half of the cost removal of the currently existing remediation techniques is for surface treatment facilities, while in the current invention, surface treatment is a minimal aspect of even the largest scale cleanups.

EXAMPLE 1

In-situ Hydrous Pyrolysis/Oxidation of Hydrocarbon and Halogenated Organic Solvents Combined with Biofilter This example describes a field treatment using the process of the invention for degradation of residual trichloroethylene in combination with the primary treatment methods: dynamic underground stripping and biofilter. A huff-and-puff treatment is utilized as the prime treatment method for degradation of TCE according to FIG. 1. The primary treatment is followed by hydrous pyrolysis/oxidation. In this system, only one well is used. Oxygen is mixed into the steam. As the steam front proceeds into the formation, at temperature approximately 140° C., all TCE encountered is oxidized and converted to carbon dioxide and chloride. After a small steam zone is established, steam pressure is stopped, and the ground water returns to the well bore through the new-heated-and oxygenated steam zone. TCE in this water is also oxidized. Steam is then turned on once more and a slightly larger steam zone is formed and then allowed to collapse. The cyclic steaming ensures that any water displaced by the steam injection only moves a few meters before being pulled back through the hot zone and cleaned.

In some instances, a biofilter can be installed. The water is allowed to move away from the injection site, forcing untreated water ahead of it. By installing a biofilter downstream, this active drive mechanism is used to force water through the biofilter. The advantages of this approach include:

(1) Less control of the outer edges of the steam zone is required, since the untreated water is moving toward a biofilter;
(2) Biofilter processes water at a greatly enhanced rate;
(3) Thermal remediation couples smoothly to biofilter; steam injection is stopped when the heated fronts approach the filter, which means that most of the source area water has been treated;
(4) Additional cold water can be injected to continue driving water through the filter; and
(5) All treatment is underground.

Process monitoring can be used to measure the extent of the steam zone, and the oxygen and TCE contents of the ground water. The process is optimized to allow the maximum rate of steam injection while obtaining full TCE destruction. Down-hole sensors can be used for this type of process control. Addition of oxygen can be minimized to keep down costs and to avoid any air-stripping of contaminant into the vadose zone. These process control measures can be sufficient to allow automation or semi-automation of the system.

After the system of steam and oxygen introduction is shut off, it continues and will continue remediating the low-concentration areas around the source for many years. As the warm water migrates further from the source of heat, TCE slowly degrade. Very little oxygen is in fact required because on a weight/weight basis, each gram of oxygen in water destroys three grams of TCE. As heat diffuses into the impermeable zones, it destroys the TCE trapped in those layers.

Changes and modifications in the specifically described embodiments can be carried out without departing from the scope of the invention which is intended to be limited only by the scope of the claims.

TABLE 1

| Chemical | Equilbrated Water g/L | % Observed | BYS Expt. Partially Reacted Water g/L | % Observed | Reportable Limit g/l | BYS2 Expt. Reacted Water g/L |
|---|---|---|---|---|---|---|
| Phenol |  | 0.0% | 1.09E-06 | 14.35% | <3.2E-08 | non-detect |
| 2Methylphenol |  | 0.0% | 1.35E-07 | 1.78% | <3.2E-08 | non-detect |
| 4-mehtylphenol |  | 0.0% | 3.01E-07 | 3.96% | <3.2E-08 | non-detect |
| 2,4-Dimehtylphenol |  | 0.0% | 5.20E-08 | 0.68% | <3.2E-08 | non-detect |
| Benzoic Acid |  | 0.0% | 4.16E-07 | 5.48% | <3.23E-07 | non-detect |
| Napthalene | 5.29E-06 | 34.5% | 7.39E-07 | 9.73% | <3.2E-08 | non-detect |
| 2-Methylnapthalene | 3.14E-06 | 20.5% | 5.62E-07 | 7.40% | <3.2E-08 | non-detect |
| Acenapthene | 1.44E-06 | 9.4% | 2.48E-07 | 3.26% | <3.2E-08 | non-detect |
| Dibenzfuran | 7.95E-07 | 5.2% | 2.62E-07 | 3.45% | <3.2E-08 | non-detect |
| Flourene | 7.22E-07 | 4.7% | 1.76E-07 | 2.32% | <3.2E-08 | non-detect |
| Phenanthrene | 1.94E-06 | 12.7% | 1.74E-06 | 22.91% | <3.2E-08 | non-detect |
| Anthracene | 2.26E-07 | 1.5% | 1.25E-07 | 1.65% | <3.2E-08 | non-detect |
| Di-nButylphthalate |  | 0.0% | 8.70E-08 | 1.15% | <3.2E-08 | non-detect |
| Fluoranthene | 8.36E-07 | 5.5% | 9.11E-07 | 11.99% | <3.2E-08 | non-detect |
| Pyrene | 6.10E-07 | 4.0% | 4.91E-07 | 6.46% | <3.2E-08 | non-detect |
| Benzo (a) Anthracene | 1.48E-07 | 1.0% | 9.70E-08 | 1.28% | <3.2E-08 | non-detect |
| Chrysene | 1.78E-07 | 1.2% | 1.64E-07 | 2.16% | <3.2E-08 | non-detect |
| Benzo (b andk) Fluoranthenes |  |  |  |  | <1.61E-07 | non-detect |
| Benzo (a) Pyrene |  |  |  |  | <1.61E-07 | non-detect |
| Total Detected | 1.53E-05 | 100% | 7.60E-06 | 100% | 1.189E-06 |  |
| Destruction |  |  | 50% |  | >92% |  |

EPA Method 8270A
Table I. Results of hydrous pyrolysis/oxidation testing of water saturated with pole-treating chemicals. "Equilibrated Water" was stirred with an excess of free-product (from a Southern California pole-treating site) for three days. "Partially Reacted Water" is the result of reacting the free-product/water mix at up to 120° C. until all oxygen was consumed, stopping the reaction. "Completely Reacted" used the decanted, equilibrated water (no free product) with an excess of oxygen. The results of this experiment are also shown in FIG. ( ).

What is claimed is:

1. A process for in situ hydrous pyrolysis/oxidation of chlorinated or fuel hydrocarbons or other volatile contaminants in underground water, comprising:
   (a) inducing hydrous pyrolysis/oxidation at a site of contamination by introducing steam and oxygen on air under pressure to a site of contamination containing underground water;
   (b) optionally relieving the build-in pressure; and
   (c) allowing the hydrous pyrolysis/oxidation at the site of contamination resulting in degradation of the contaminants to proceed.

2. The process of claim 1, wherein the contaminant is selected from the group consisting of trichloroethane, trichloroethylene, perchloroethylene, dichloroethane, benzene, toluene, ethylbenzene, m- xylene, o-xylene, p-xylene, methyl tert-butyl ether, pentachlorophenol, phenol, 2-methylphenol, 4-methylphenol, 2,4-dimethylphenol, benzoic acid, napthalene, 2-methylnapthalene, acenapthene, dibenzfuran, flourene, phenanthrene, anthracene, di-nbutylphthalate, fluoranthene, pyrene, benzo (a) anthracene, chrysene, benzo (b and k) fluoranthenes, benzo (a) pyrene, and mixtures thereof.

3. The process of claim 1, further comprising inducing hydrous pyrolysis/oxidation at a temperature between 40° C. and 200° C.

4. The process of claim 1, further comprising introducing a hydrocarbon degradation catalyst to the site.

5. The process of claim 4, wherein the catalyst is an oxidant selected from the group consisting of manganese dioxide and ferric oxide.

6. The process of claim 1, wherein a hydrocarbon degradation catalyst is present in the soil at the site naturally.

7. The process of claim 1, further comprising heating the ground by a method selected from the group consisting of direct electrical resistance heating, radio frequency heating, and microwave heating.

8. The process of claim 1, where the injection of steam, air or oxygen is repeated multiple times.

9. A process for in situ hydrous pyrolysis/oxidation of chlorinated or fuel hydrocarbons or other volatile contaminants in underground water, said process comprising:
   (a) inducing underground stripping at a site of contamination;
   (b) subsequently introducing oxygen under pressure to the site of contamination, and optionally heating;
   (c) mixing the oxygen with contaminated water at the site of contamination; and
   (d) allowing the hydrous pyrolysis/oxidation to proceed at the site of contamination resulting in degradation of the hydrocarbons and contaminants.

10. The process of claim 9, further comprising inducing hydrous pyrolysis/oxidation at a temperature from above about 70 degrees C. to about 125 degrees C.

11. The process of claim 10, further comprising introducing steam to the site of contamination.

12. The process of claim 10, further comprising introducing a hydrocarbon degradation catalyst to the site of contamination.

13. A process for in situ hydrous pyrolysis/oxidation of chlorinated or fuel hydrocarbons or other volatile contaminants in underground water, said process comprising:
    (a) introducing steam under pressure and an oxidant of the hydrocarbons or contaminants to the site of contamination;
    (b) allowing the oxidant to mix with contaminated water at the site of contamination; and
    (c) allowing the hydrous pyrolysis/oxidation to proceed at the site of contamination resulting in degradation of the hydrocarbons and contaminants.

14. The process of claim 13, further comprising inducing hydrous pyrolysis/oxidation at a temperature from above about 70 degrees C. to about 125 degrees C.

15. The process of claim 14, wherein said oxidant includes a mineral oxidant or oxygen already dissolved in the contaminated water at the site of contamination.

16. The process of claim 14, further comprising introducing a hydrocarbon degradation catalyst to the site of contamination.

* * * * *